(12) United States Patent
Sato et al.

(10) Patent No.: US 7,241,471 B2
(45) Date of Patent: Jul. 10, 2007

(54) MAGNETIC RECORDING MEDIUM AND METHOD OF FABRICATING THE SAME

(75) Inventors: Yasumi Sato, Miyagi (JP); Jota Ito, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/885,340

(22) Filed: Jul. 6, 2004

(65) Prior Publication Data

US 2004/0240111 A1   Dec. 2, 2004

Related U.S. Application Data

(62) Division of application No. 10/412,946, filed on Apr. 14, 2003.

(30) Foreign Application Priority Data

Apr. 22, 2002  (JP) ............................... 2002-118979

(51) Int. Cl.
*B05D 5/12* (2006.01)

(52) U.S. Cl. ................... 427/128; 427/248.1; 427/127; 427/131; 428/836.1

(58) Field of Classification Search ............. 427/248.1, 427/127, 128, 131; 428/836.1
See application file for complete search history.

(56) References Cited

U.S. PATENT DOCUMENTS

| | | | | |
|---|---|---|---|---|
| 4,505,966 A | * | 3/1985 | Adachi et al. | 428/141 |
| 5,244,751 A | * | 9/1993 | Takayama et al. | 428/836.2 |
| 5,247,397 A | * | 9/1993 | Sato et al. | 360/17 |
| 5,326,637 A | * | 7/1994 | Nasu et al. | 428/336 |
| 5,851,660 A | * | 12/1998 | Tohma et al. | 428/336 |
| 6,773,745 B2 | * | 8/2004 | Arisaka et al. | 427/130 |

* cited by examiner

*Primary Examiner*—Alain L. Bashore
(74) *Attorney, Agent, or Firm*—Robert J. Depke; Rockey, Depke, Lyons & Kitzinger LLC

(57) ABSTRACT

A method of fabricating a low-noise, high-output and large-capacity magnetic recording medium compatible with the AIT3 format in which a metal magnetic film is formed by the vacuum evaporation process under supply of oxygen is disclosed. In the vacuum evaporation process, the running speed of a non-magnetic support is controlled within a range from 150 to 200 m/min, and on thus continuously fast-running, non-magnetic support, a Co magnetic thin film is formed under supply of oxygen so as to achieve a coercive force Hc of the Co magnetic thin film of 100 to 115 kA/m, and a squareness ratio of 0.79 or larger.

1 Claim, 6 Drawing Sheets

MAGNETIC RECORDING MEDIUM AND METHOD OF FABRICATING THE SAME

CROSS REFERENCES TO RELATED APPLICATIONS

The subject matter of application Ser. No. 10/412,946 is incorporated herein by reference. The present application is a divisional of U.S. application Ser. No. 10/412,946, filed Apr. 14, 2003, which claims priority to Japanese Patent Application No. JP2002-118979, filed Apr. 22, 2002. The present application claims priority to these previously filed applications.

BACKGROUND OF THE INVENTION

1. Field of the Invention

The present invention relates to a magnetic tape having a large recording capacity suitable for use as a storage medium for office computers, including miniature computers and personal computers and for other computers for use in various applications, and in particular to a magnetic tape used as an external storage medium.

2. Description of the Related Art

Keeping pace with recent wide-spreading of office computers such as miniature computers and personal computers, there is a growing trend in research on a magnetic tape that serves as an external storage medium for recording computer data, which is known as a tape streamer. In the effort for putting the magnetic tape of this kind into practical use, there is a strong demand for increasing the recording capacity thereof in order to store a larger amount of data in a smaller body, corresponding with recent trends in computers such as down-sizing and enhancing information processing performance.

There are also growing demands on more advanced reliability of the magnetic tape which has been used under more diversified environmental conditions than before, in particular under wide variation of temperature and humidity conditions, and on more advanced performance of stable recording and reading of data under high-speed running of the tape repeated in a great number of times.

The magnetic tape generally has a non-magnetic support which is made of a flexible member of a synthetic resin or the like, and has a magnetic layer formed thereon. For the purpose of achieving a large recording capacity (volume recording capacity) sufficient for use in the above-described applications, it is generally believed as effective to use a ferromagnetic metal thin film as the magnetic layer to thereby raise the recording density of the magnetic layer per se, and to thin the total thickness of the magnetic tape. That is, a magnetic tape such that having a metal thin film formed on a non-magnetic support is beneficial, which tape is known as so-called evaporation tape.

A film most generally used for a non-magnetic support of the evaporation tape on which the magnetic metal thin film is formed is polyester film, which is mainly a polyethylene terephthalate film. In particular, polyethylene terephthalate film of approx. 7 to 10 μm thick is used as the non-magnetic support of home-video cassette tapes, which is typically an 8-mm tape, and polyethylene film of approx. 5 to 7 μm thick is used as that of tape streamer for computer data back-up.

One known strategy for elongating the recording time of a magnetic recording medium used for video tape is disclosed in Japanese Laid-Open Patent Publication No. 6-215350, which describes that the non-magnetic support is preferably composed of polyester as a major component, and more specifically of polyethylene naphthalate. There is, however, a further demand for thinning the recording medium in pursuit of still longer recording time of video cassette tapes and larger recording capacity of tape streamers.

With recent increase in information volume to be handled, there is a strong demand for increasing the recording capacity of tape streamers. This means shortening of the recording wavelength and narrowing of the track pitch. Both of such shortening of the recording wavelength and narrowing of the track pitch, however, may undesirably degrade the output level and S/N ratio. It is therefore necessary to further raise the performance of the head, and to further enhance the output level and S/N ratio.

There is known a major standard for tape storage called AIT (Advanced Intelligent Tape; names of a standard and a tape drive developed by Sony Corporation) which defines a format for tape streamers using 8-mm evaporation-type tape as a recording medium. With regard to the standard, the next-generation format AIT3 (approx. 100 GB/tape) has been coming up. Under AIT3, the recording capacity must further be upgraded as compared with that under the current AIT2 (approx. 50 GB/tape). Doubled capacity may be achieved by halving the conventional track pitch, but it also requires further enhancement of the output level higher than that under the current AIT2.

Figure 1:
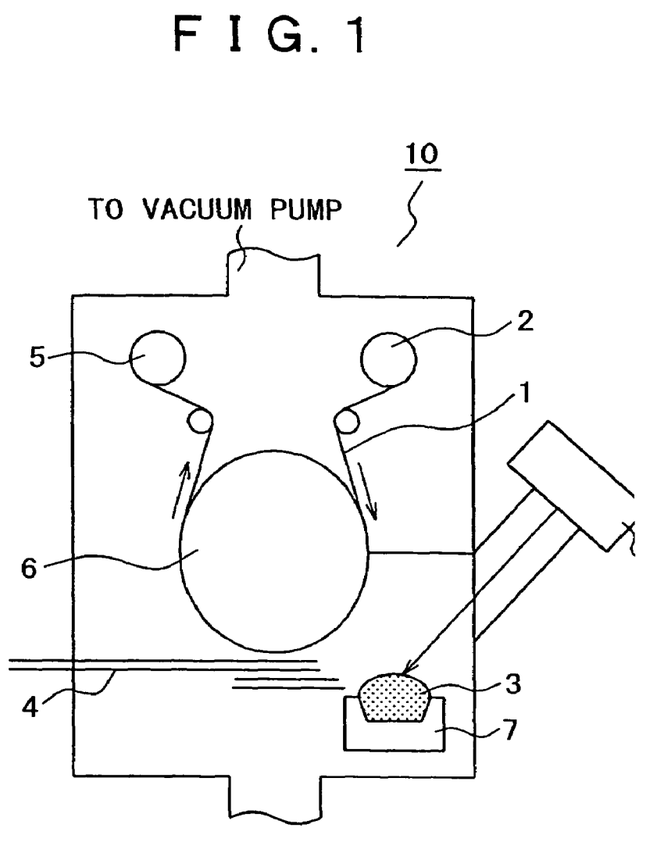
FIG. 1 is a schematic drawing of a continuous-take-up vacuum evaporation apparatus for forming the magnetic layer composed of a magnetic metal thin film, as described in the detailed description and preferred examples of the present invention.

One known large-capacity magnetic tape is such that having an evaporated film of a ferromagnetic metal, such as Co, or an alloy thereof, and it is known that the capacity thereof can successfully be raised by introducing oxygen in the evaporation process for forming the magnetic metal thin film as the magnetic layer. A continuous take-up vacuum evaporation apparatus 10 as illustrated in FIG. 1 can be used in the method of depositing a metal magnetic material, which is typically Co, on the non-magnetic support while introducing oxygen. In the drawing, a non-magnetic support 1 is continuously fed out from a feeding roll 2, on the surface of which a metal magnetic material 3 (Co) is deposited under the presence of a trace amount of oxygen supplied from an oxygen introducing duct 4 so as to form a magnetic metal thin film, and is then taken up by a take-up roll 5. By introducing oxygen herein, size of Co crystal grown in the evaporation process is reduced to a very fine degree, and this increases residual magnetization Mr and thus improves the output level.

SUMMARY OF THE INVENTION

In the aforementioned evaporation of Co under the introduction of oxygen, too small amount of introduced oxygen would fail in reducing the crystal size, and this undesirably results in a lowered output level of the magnetic layer including such magnetic metal thin film, and thus increases noises.

On the contrary, too large amount of introduced oxygen will be advantageous in reducing noises by virtue of finely reduced crystal size and in raising the output level by virtue of increased coercive force Hc and resultant decreased self-demagnetization, where the output level will be raised only in a limited range, while being limited by a maximum value. An effort to raise the coercive force Hc by increasing the amount of introduced oxygen beyond a value corresponded to the maximum output level will undesirably reduce the residual magnetization Mr to thereby lower the output level.

Under the introduction of oxygen, the surface of the magnetic layer will have an oxide film formed thereon, where the thickness of the oxide film becomes thinner as the amount of introduced oxygen decreases, and this tends to raise the output. Too small amount of introduced oxygen, however, raises a contradictory effect on the output since, as described in the above, the crystal size of the deposited metal magnetic material (Co) cannot fully be reduced, which consequently lowers the output.

As described in the above, in the magnetic tape which is composed of a non-magnetic support and a magnetic metal thin film formed thereon under the presence of introduced oxygen, there has been a problem on how to balance characteristics regarding coercive force Hc and residual magnetization Mr in order to produce large output while ensuring a low noise, or high S/N.

The present invention is conceived in view of the aforementioned problems. It is desirable to solve the problems which have resided in magnetic recording medium obtained by forming the magnetic metal thin film thereof through the vacuum evaporation process under the presence of introduced oxygen, so as to provide a low-noise, large-capacity magnetic recording medium of which residual magnetization Mr is upgraded while keeping the coercive force Hc at a reasonable level, and to provide a method of fabricating such medium.

From the technical background described in the above, the present inventors found out that, in the process of continuously forming a magnetic layer which includes a magnetic metal thin film on a non-magnetic support by the vacuum evaporation process whereby a metal magnetic material is deposited under the presence of introduced oxygen, fineness of the metal crystal size and degree of oxidation of the magnetic layer can be controlled by allowing the non-magnetic support to run faster than in the conventional process and by properly adjusting the output power for carrying out the vacuum evaporation of the metal magnetic material. This successfully controls the coercive force Hc and squareness ratio Rs to proper values, and ensures low noise and high output.

It is to be noted that the squareness ratio Rs is expressed by a ratio of residual magnetization Mr and saturated magnetization. Ms (Mr/Ms), and is a characteristic directly correlated to the level of residual magnetization Mr.

The metal magnetic materials include alloy, where Co and Co alloy are particularly preferable for use in the magnetic recording medium of the present invention.

A first aspect of the present invention relates to a magnetic recording medium which is of evaporation-type. The magnetic recording medium has a non-magnetic support and a magnetic layer including at least a magnetic metal thin film provided thereon, where the magnetic metal thin film has a coercive force Hc of 100 to 115 kA/m, both inclusive, and a squareness ratio Rs of 0.79 or larger.

A second aspect of the present invention relates to the aforementioned magnetic recording medium where the non-magnetic support is a polyamide film.

A third aspect of the present invention relates to the aforementioned magnetic recording medium which is in compliance with the AIT3 format for magnetic recording system.

According to the first trough third aspects of the present invention, the coercive force Hc of the deposited magnetic metal thin film may be adjusted within a range from 100 kA/m to 115 kA/m, and the squareness ratio may be adjusted to 0.79 or larger. This would successfully result in reducing the noise and increasing the output, and may be able to provide a high-density magnetic recording medium which is in compliance with the AIT3 format, a major standard for the next-generation tape storage, while ensuring a recording frequency of 2T (21.55 MHz) and an output larger by 1.5 dB or more than that in the AIT2 format.

Using a polyamide film as the non-magnetic support is beneficial in increasing strength and reducing thickness of the magnetic tape, and this is advantageous in providing a large-capacity, long-time-recordable magnetic recording medium.

A fourth aspect of the present invention relates to a method of fabricating a magnetic recording medium in which a magnetic layer including at least a magnetic metal thin film is formed on a non-magnetic support by a vacuum evaporation process in which a metal magnetic material is deposited on the non-magnetic support, which is in continuous running, under supply of oxygen gas so as to have a coercive force Hc of 100 kA/m to 115 kA/m, both inclusive, and a squareness ratio of 0.79 or larger. In the fourth aspect, the non-magnetic support may be fed at a running speed of 150 m/min to 200 m/min, both inclusive.

By controlling the running speed of the non-magnetic support as fast as 150 m/min to 200 m/min, both inclusive, in the vacuum evaporation process whereby the metal magnetic material is deposited on the continuously-run, non-magnetic support under the supply of oxygen gas, the metal crystal size is effectively reduced, and the degree of oxidation of the magnetic layer is controlled to a lower level than before. As a consequence, the thickness of the surface oxide film is reduced, thereby reducing the gap loss. This is successful enough to provide a method of fabricating a magnetic recording medium having coercive force Hc retained at a reasonable level, improved residual magnetization Mr, low noise and high output.

It is to be noted that the present invention tends to slightly lower the coercive force Hc of the magnetic recording medium as compared with the conventional one measured under optimized output conditions due to introduction of a high-rate evaporation method to achieve the output of 1.5 dB that may be adapted to the next generation AIT format.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which.

DETAILED DESCRIPTION OF THE PREFERRED EMBODIMENTS

Figure 2:
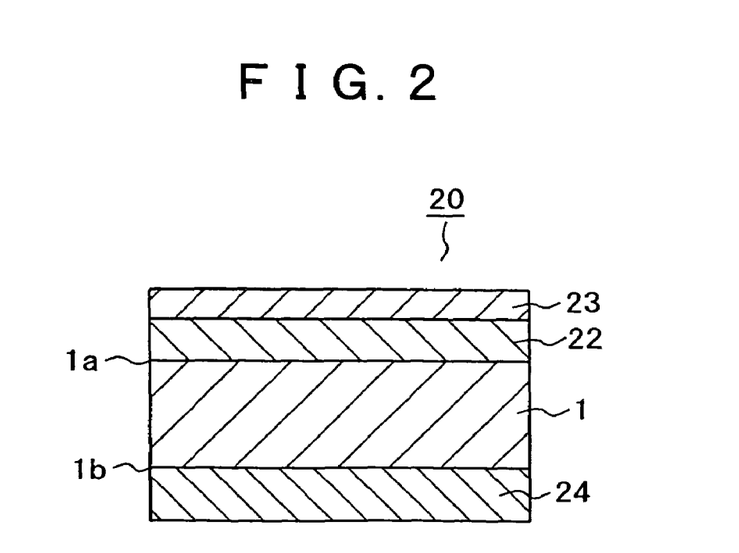
FIG. 2 is a schematic sectional view of a magnetic recording medium according to the embodiment of the present invention.
Figure 3:
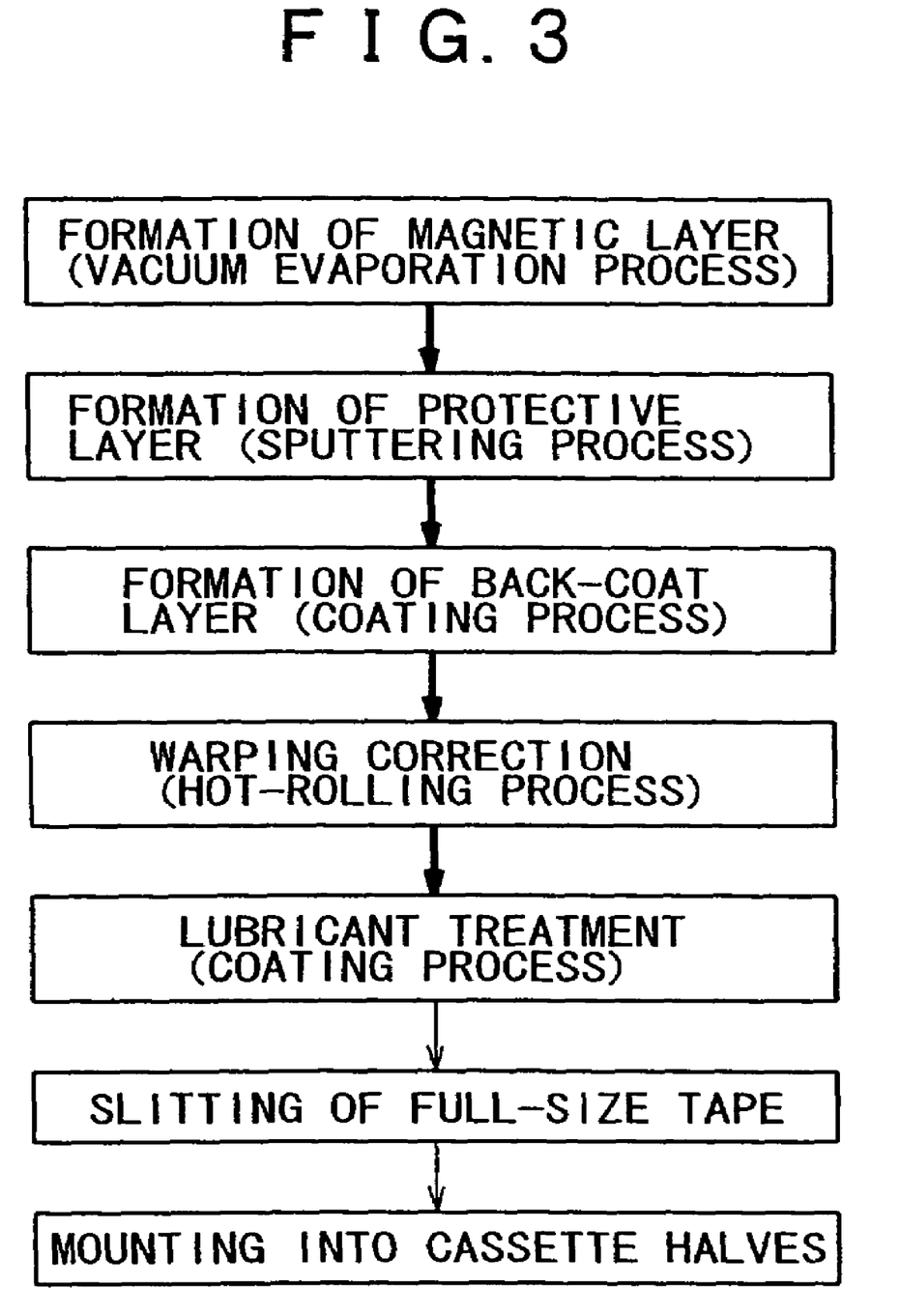
FIG. 3 is a flow chart for simply expressing process steps of a method of fabricating the magnetic recording medium according to the embodiment and preferred examples of the present invention.

Embodiments of the present invention will further be detailed referring to an exemplary constitution of the magnetic recording medium shown in FIG. 2, an overall process flow of the magnetic recording medium shown in FIG. 3, and exemplary methods for forming the individual component layers. It is to be noted that the present invention is by no means limited to the embodiments below, and instead, any other constitutions or combinations may be allowable provided that they do not depart from the scope of the invention.

As shown in FIG. 2, a magnetic recording medium in accordance with the present invention includes a non-magnetic support 1, a magnetic layer 22 composed of a magnetic metal thin film formed on one principal surface 1a of the non-magnetic support 1, a protective layer 23 formed on the surface of the magnetic layer 22, and a back-coat layer 24 formed on the other principal plane 1b of the non-magnetic support 1. The magnetic recording medium having such constitution may be fabricated typically according to the schematic process flow shown in FIG. 3.

The non-magnetic support 1 of the magnetic recording medium is preferably composed of a flexible material (film, etc.) such as synthetic resin, and more preferably composed of a polyamide film. The non-magnetic support 1 made of a polyamide film desirably has a mechanical strength larger than that of polyethylene terephthalate film or polyethylene naphthalate film, and makes it possible to thin the magnetic recording medium so as to be well suited to capacity expansion of tape streamers. The magnetic layer 22 composed of a magnetic metal thin film is preferably such that being made of Co or Co alloy. Next paragraphs will detail the individual process steps for fabricating the medium.

[Formation of Magnetic Layer]

As described in the above in the present invention, the magnetic layer 22 composed of the ferromagnetic metal thin film is formed on the continuously-run, non-magnetic support 1 by depositing a metal magnetic material by the vacuum evaporation process under supply of oxygen gas, where the running speed of the non-magnetic support 1 is controlled within an appropriate range but faster (approx. 100 m/min) than that in the conventional process. Formation of the magnetic layer 22 will be described below referring to a case in which the continuous take-up vacuum evaporation apparatus previously shown in FIG. 1 is used for the deposition.

A polyamide film (simply referred to as the "film") used as the non-magnetic support 1 is loaded so as to be supplied from the supply roll 2, run along the circumferential surface of a cooling can 6, and to be continuously taken up by the take-up roll 5. During the continuous run, the metal magnetic material 3, which is typically Co, placed in a crucible 7 heated by electron beam emitted from an electron gun 8 is evaporated so as to adhere onto the non-magnetic support 1, whereby the magnetic layer 22 is formed. The magnetic layer 22 is oxidized to an appropriate degree during the formation thereof by oxygen introduced through the oxygen introducing duct 4, which reduces the size of the magnetic metal crystal (Co crystal).

The present inventors found out that, in the deposition of the metal magnetic material 3 in the crucible 7, which is Co for example, it is preferable to raise the running speed of the non-magnetic support 1 faster than that in the conventional process, and to increase electric energy applied to the electron gun 8 so as to enhance the electron beam output, since the magnetic metal thin film formed under the above conditions and having the thickness same as that of the conventional film is found not only to contain smaller Co crystals, but also to provide a maximum output under a smaller degree of film oxidation, and still also to achieve even higher maximum output than the previous. The output characteristics herein are, of course, compared at the same wavelength.

The above-described method of achieving a large output of the magnetic layer by controlling the deposition at a faster speed and under a suppressed degree of film oxidation, that is under a lower degree of film oxidation than the previous, is referred to as the "high-rate evaporation process", whereby the magnetic recording medium can be fabricated.

To adjust the output to a desired value of 1.5 dB or larger by the high-rate evaporation process, the running speed of the film used as the non-magnetic support 1 preferably falls within a range from 150 m/min to 200 m/min, both inclusive. The speed slower than 150 m/min may be unsuccessful in achieving the desired value of 1.5 dB or larger. On the other hand, the speed faster than 200 m/min may exceed a limit of general performance of the apparatus, and this makes it difficult to achieve a predetermined thickness of the magnetic metal thin film.

The coercive force Hc smaller than 100 kA/m or larger than 115 kA/m will be unsuccessful in achieving an output of 1.5 dB or larger, and the squareness ratio Rs smaller than 0.79 will be again unsuccessful in achieving the output of 1.5 dB or larger.

[Formation of Protective Layer]

Figure 4:
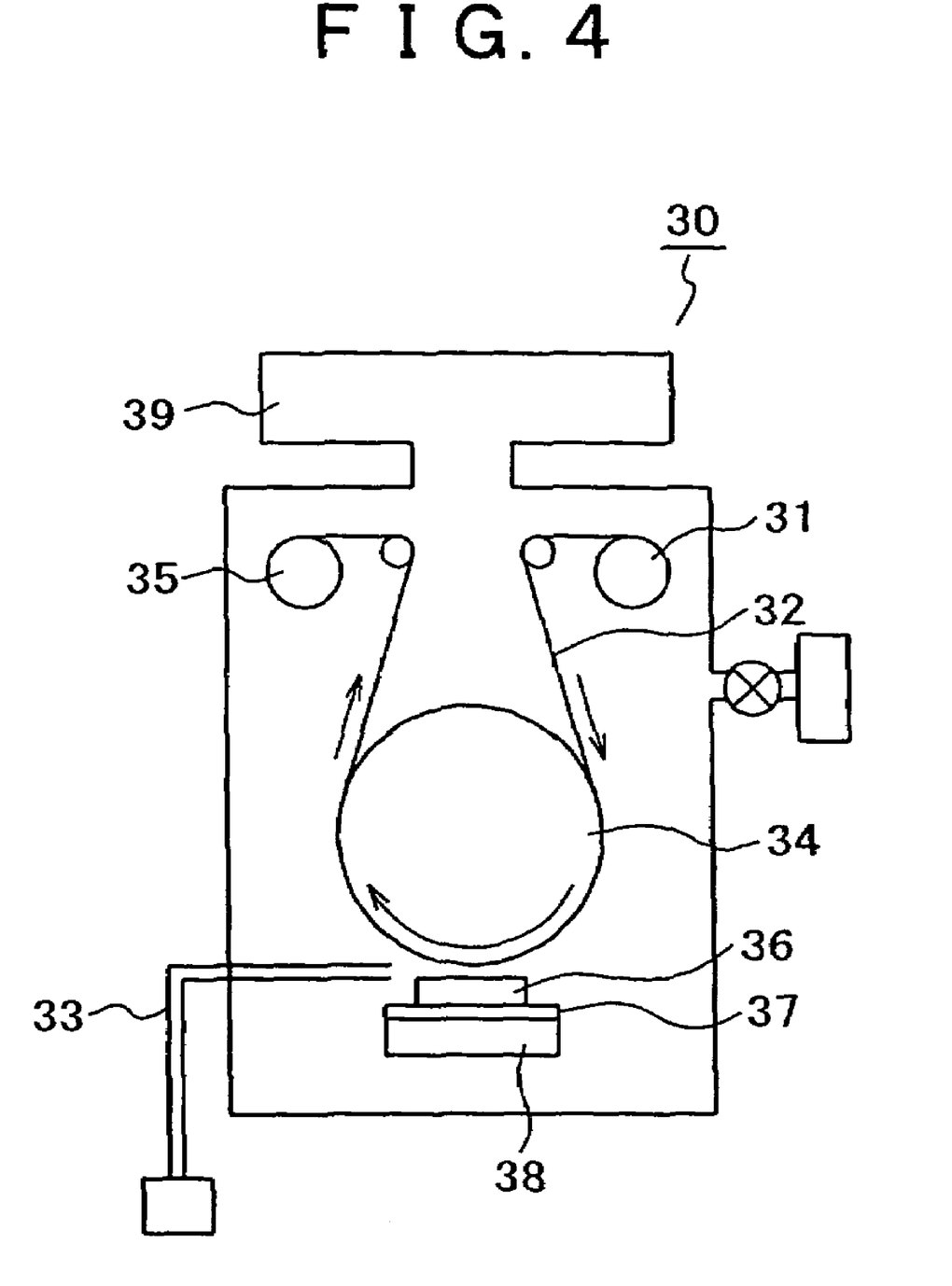
FIG. 4 is a schematic drawing of a magnetron sputtering apparatus used for forming a protective layer in the embodiment and preferred examples of the present invention.

Next, the protective layer 23 is formed on the surface of the magnetic layer 22 already formed on a film 32, using a magnetron sputtering apparatus 30 shown in FIG. 4. More specifically, the film 32 having the magnetic layer 22 already formed thereon is loaded on the magnetron sputtering apparatus 30 so as to be supplied from a supply roll 31, and to run via the circumferential surface of a cooling can 34 to a take-up roll 35. The inner space of the apparatus is evacuated to a pressure of $10^{-4}$ Pa or around using an evacuation apparatus 39, and an inert gas, such as Ar gas, is introduced through a gas introducing duct 33. The inner pressure of the apparatus herein is kept at 0.8 Pa or around. Next, the film 32 is allowed to run on the cooling can 34 cooled at approx. −40° C., during which the protective film 23 is formed on the magnetic layer 22 by sputtering a target 36 (carbon, for example) placed on the backing plate 37. The thickness of the protective layer 23 composed of a carbon film is preferably 8 nm or around. The running speed is set at approx. 15 m/min.

[Formation of Back-Coat Layer]

The back-coat layer 24 is then formed on the other principal surface 1b, opposite to the principal surface 1a, of the non-magnetic support 1 (simply referred to as the "film") having the magnetic layer 22 already formed thereon.

The back-coat layer 24 can be formed using so-called coating mixture prepared by dispersing or dissolving, for example, carbon and binder resin into a variety of solvents. The binder resin used for the coating preparation may be of any kind so far as it can satisfy any characteristics required for the recording medium, where examples of which include polyester-polyurethane. The back-coat layer 24 can be formed by coating the back-coat coating mixture on the other principal surface 1*b* of the polyamide film, and then by drying.

[Warping Correction]

Figure 5:
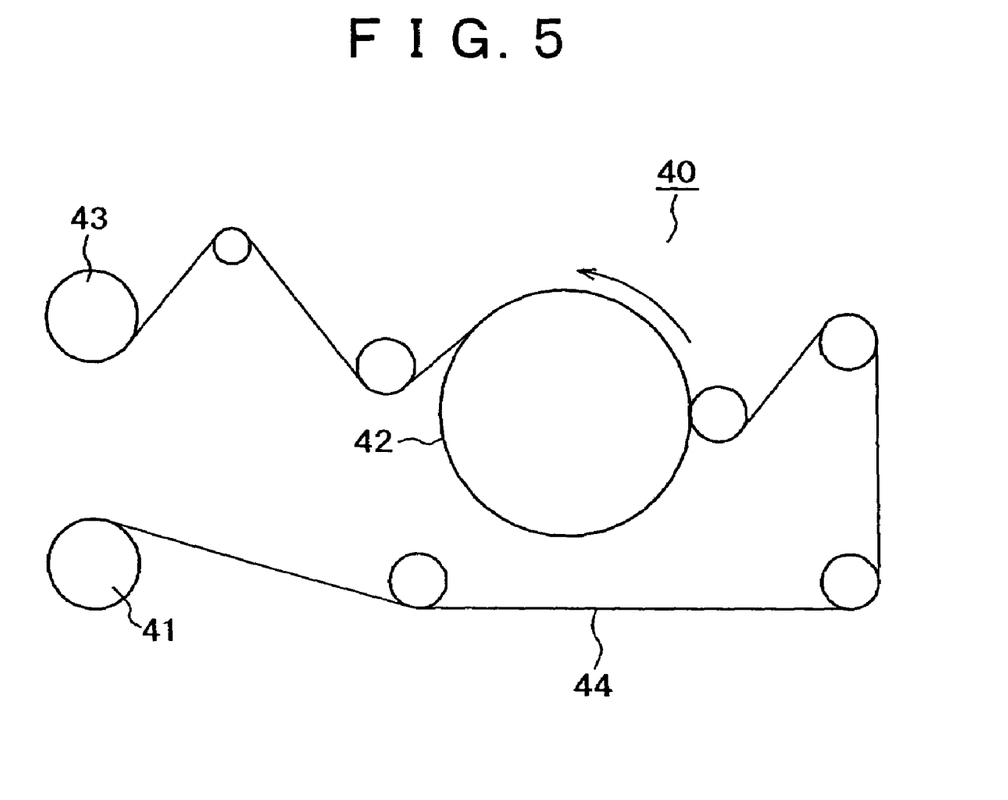
FIG. 5 is a schematic drawing showing an overall constitution of a hot-roll apparatus used for annealing for warping correction in the embodiment and preferred examples of the present invention.

After the back-coat layer 24 is formed, annealing for correcting warping (cupping) of the tape, or so-called hot-rolling, is carried out using a hot-rolling apparatus 40, the schematic constitution of which is shown in FIG. 5. In FIG. 5, the heat roll 42 is a metal cylindrical roll having a diameter of 250 mm or around, within which a heating means, such as heat induction coil or the like, is provided, and is designed so as to allow arbitrary control of the surface temperature of the roll within a predetermined temperature range. The temperature range herein is controlled to approx. 100° C. to 300° C. A film 44 having the magnetic layer 22 and carbon protective layer 23 already formed thereon is supplied from a feeding roll 41, warping of the film is corrected while being run so that the magnetic layer-side of the film comes into contact with the rotating heat roll 42, and the film is then taken up by a take-up roll 43.

[Lubricant Treatment]

After the warping is corrected, a lubricant is coated on the surface of the carbon protective layer 23 formed on the film. Perfluoropolyether-base lubricants are preferably used herein, where the thickness of coating is 10 nm or around. Such coating of the lubricant ensures an excellent running property, wear resistance and durability.

After the above-described process steps, an full-size tape having the magnetic layer 22 composed of a magnetic metal thin film, protective layer 23, back-coat layer 24, and lubricant film formed on the non-magnetic support 1, which is typically a polyamide film, is fabricated. Thus fabricated full-size tape is slit into an 8-mm width to thereby produce a magnetic tape. The magnetic tape housed into AIT cassette halves can provide an AIT cassette tape.

EXAMPLES

The present invention will further be detailed referring to the following examples. The present invention is, however, by no means limited to the examples.

Examples 1 to 26

Figure 6:
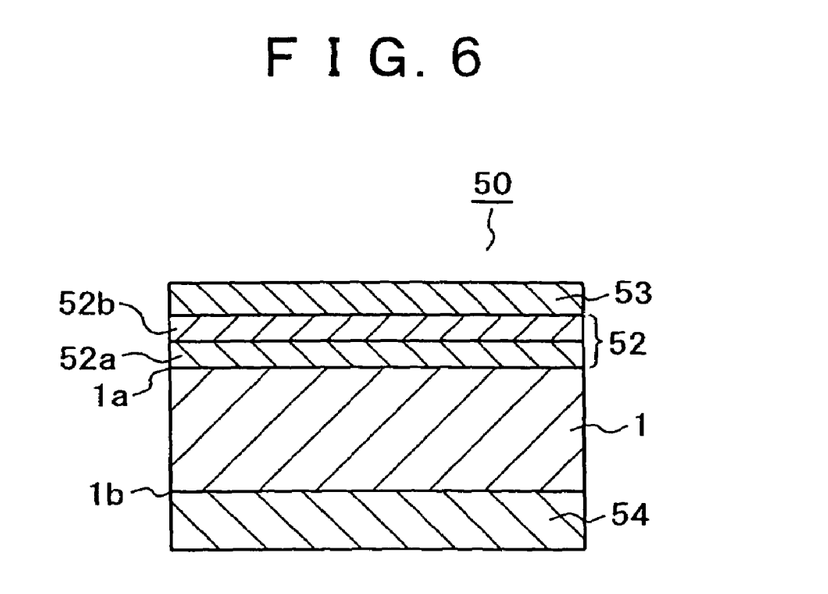
FIG. 6 is a schematic sectional view showing a layer constitution of a magnetic recording medium according to preferred examples of the present invention.

A magnetic recording medium, of which layer constitution is shown in FIG. 6, is fabricated similarly to as shown in FIG. 3. That is, the magnetic recording medium shown in FIG. 6 includes a non-magnetic support 1 made of a polyamide film (a product of Toray Industries, Inc.); a double-layered magnetic layer 52 which includes a Co magnetic thin film (lower layer) 52*a* and a Co magnetic thin film (upper layer) 52*b*, formed on one principal surface 1*a* of the non-magnetic support 1; a protective layer 53 which includes a carbon film formed on the magnetic layer 52; and a back-coat layer 54 which includes a carbon black film formed on the other principal surface 1*b* of the non-magnetic support 1. Process conditions of the individual component layers will be shown below.

First, using a continuous take-up vacuum evaporation apparatus 10 as illustrated in FIG. 1, two layers of evaporated film are formed on one principal surface of the non-magnetic support 1 by the high-rate evaporation process of the present invention. More specifically, a polyamide film (simply referred to as the "film") of 1 m wide and 10,000 m long is used as the non-magnetic support 1, the film is loaded on the continuous take-up vacuum evaporation apparatus 10, and the inner space of the apparatus is evacuated to a pressure of $10^{-3}$ Pa. On the surface of the continuously running film, the Co magnetic metal thin film (Co magnetic thin film) is formed by the continuous oblique-angled vacuum evaporation process, where the running speed of the film and the amount of introduced oxygen are varied as listed in Table 1.

Oxygen is introduced through the oxygen introducing duct 4. An angle of incidence in the vacuum evaporation is set within a range from 90° to 45° away from the normal line on the polyamide film. The cooling can 6 is conditioned at −40° C. The Co magnetic film is formed by varying the power to be applied to the electron gun 8 so that the electron beam energy could always ensure the film thickness constantly at 0.10 μm. After the Co magnetic film (lower layer) 52*a* is formed under the above-described conditions, the film is rewound, and the Co magnetic film (upper layer) 52*b* is then formed on the surface of the Co magnetic film (lower layer) 52*a* under similar conditions. The electron beam energy is adjusted again so as to ensure the film thickness of the upper layer constantly at 0.10 μm.

Since a predetermined thickness of the metal magnetic film cannot be obtained under the film running speed exceeding 200 m/min due to limitations in performance of the apparatus, the present inventors did not carry out any experiments at the speed faster than the above.

TABLE 1

| Example | Running speed (m/min) | Flow rate of injected oxygen (l/min) |
|---|---|---|
| 1 | 100 | 2.0 |
| 2 | | 2.2 |
| 3 | | 2.6 |
| 4 | | 2.8 |
| 5 | | 3.0 |
| 6 | 130 | 2.2 |
| 7 | | 2.6 |
| 8 | | 2.8 |
| 9 | | 3.0 |
| 10 | | 3.2 |
| 11 | 150 | 2.6 |
| 12 | | 2.8 |
| 13 | | 3.0 |
| 14 | | 3.4 |
| 15 | | 3.6 |
| 16 | 170 | 2.8 |
| 17 | | 3.0 |
| 18 | | 3.3 |
| 19 | | 3.5 |
| 20 | | 3.8 |
| 21 | 200 | 3.2 |
| 22 | | 3.4 |
| 23 | | 3.7 |
| 24 | | 3.9 |
| 25 | | 4.2 |
| 26 | | 4.4 |

On the surface of thus-obtained magnetic layer 52 of the individual evaporation film obtained under the individual conditions listed in Table 1, the carbon protective layer 53 is formed by the DC sputtering process using the magnetron sputtering apparatus 30 having a constitution previously shown in FIG. 4. The sputtering is carried out similarly to as described in the embodiment in the above, where the inner space of the apparatus is evacuated to a pressure of $10^{-4}$ Pa, and Ar gas is then introduced to thereby re-adjust the pressure at 0.8 Pa. By setting the temperature of the cooling can 34 to −40° C., and the running speed to 15 m/min, the carbon protective film is formed on the surface of the magnetic layer 52 so that the thickness thereof is adjusted to 8 nm.

After the magnetic layer 52 and protective layer 53 are formed on the film, a coating mixture for forming the back-coat layer is prepared according to the composition below, and the coating mixture is then coated on the principal surface 1b opposite to the surface on which the Co magnetic thin film has already been formed, and the coated mixture is dried to thereby obtain the back-coat layer 54 containing carbon.

| <Composition of Coating Mixture for Back-Coat Layer> | |
| --- | --- |
| carbon black (Asahi Carbon K.K.: #50) | 100 parts |
| polyester-polyurethane (*1) | 100 parts |
| methylethyl ketone (*2) | 500 parts |
| toluene (*2) | 500 parts |

(*1): Nipporan, product of NIPPON POLYURETHANE INDUSTRY CO., LTD; product name: N-2304,
(*2): solvent The individual films (a group of sample tapes) having the individual component layers formed according to the above conditions are then subjected to hot rolling in order to correct the warping (cupping) using the hot-rolling apparatus 40, the schematic constitution of which is shown in FIG. 5. The process conditions are same as those described in the embodiment. The heat roll 42 is a metal cylindrical roll having a diameter of 250 mm, and is designed to control the surface temperature thereof within a range from 100° C. to 300° C. using a built-in induction heating coil.

On the surface of the protective layer of 53 thus treated by hot-rolling, perfluoropolyether is coated as a lubricant in a thickness of approx. 10 nm.

<Evaluation>

Thus obtained full-size tape, composed of the non-magnetic support 1 made of a polyamide film, carbon protective layer 53 and back-coat layer 54 formed thereon, and coated with the lubricant, is slit to obtain sample tapes of 8 mm wide, mounted into AIT cassette halves, and measured for the output using an AIT3 drive at a recording frequency of 2T (21.55 MNz). The magnetic characteristics are measured using a VSM (vibrating sample magnetometer). Results are shown in Table 2, and FIGS. 7 and 8. Table 2 again lists the running speed of the individual non-magnetic supports listed previously in Table 1.

TABLE 2

| Example | Running speed (m/min) | Coercive force Hc (kA/m) | Squareness Rs | AIT3 2T output* (dB) |
| --- | --- | --- | --- | --- |
| 1 | 100 | 115 | 0.760 | 0.7 |
| 2 |  | 119 | 0.770 | 0.9 |
| 3 |  | 123 | 0.780 | 1.0 |
| 4 |  | 126 | 0.790 | 0.9 |
| 5 |  | 131 | 0.810 | 0.7 |
| 6 | 130 | 104 | 0.765 | 1.0 |
| 7 |  | 109 | 0.775 | 1.4 |
| 8 |  | 115 | 0.785 | 1.4 |
| 9 |  | 120 | 0.800 | 1.3 |
| 10 |  | 123 | 0.810 | 1.1 |
| 11 | 150 | 98 | 0.780 | 0.9 |
| 12 |  | 105 | 0.790 | 1.5 |
| 13 |  | 111 | 0.800 | 1.7 |
| 14 |  | 118 | 0.810 | 1.4 |
| 15 |  | 122 | 0.815 | 1.2 |
| 16 | 170 | 98 | 0.810 | 1.2 |
| 17 |  | 102 | 0.810 | 1.6 |
| 18 |  | 108 | 0.815 | 1.8 |
| 19 |  | 115 | 0.815 | 1.6 |
| 20 |  | 120 | 0.820 | 1.3 |
| 21 | 200 | 95 | 0.820 | 1.1 |
| 22 |  | 102 | 0.825 | 1.9 |
| 23 |  | 109 | 0.825 | 2.0 |
| 24 |  | 114 | 0.825 | 1.8 |
| 25 |  | 120 | 0.830 | 1.3 |
| 26 |  | 125 | 0.830 | 1.0 |

*Required output for AIT3 is 1.5 dB or larger

Figure 7:
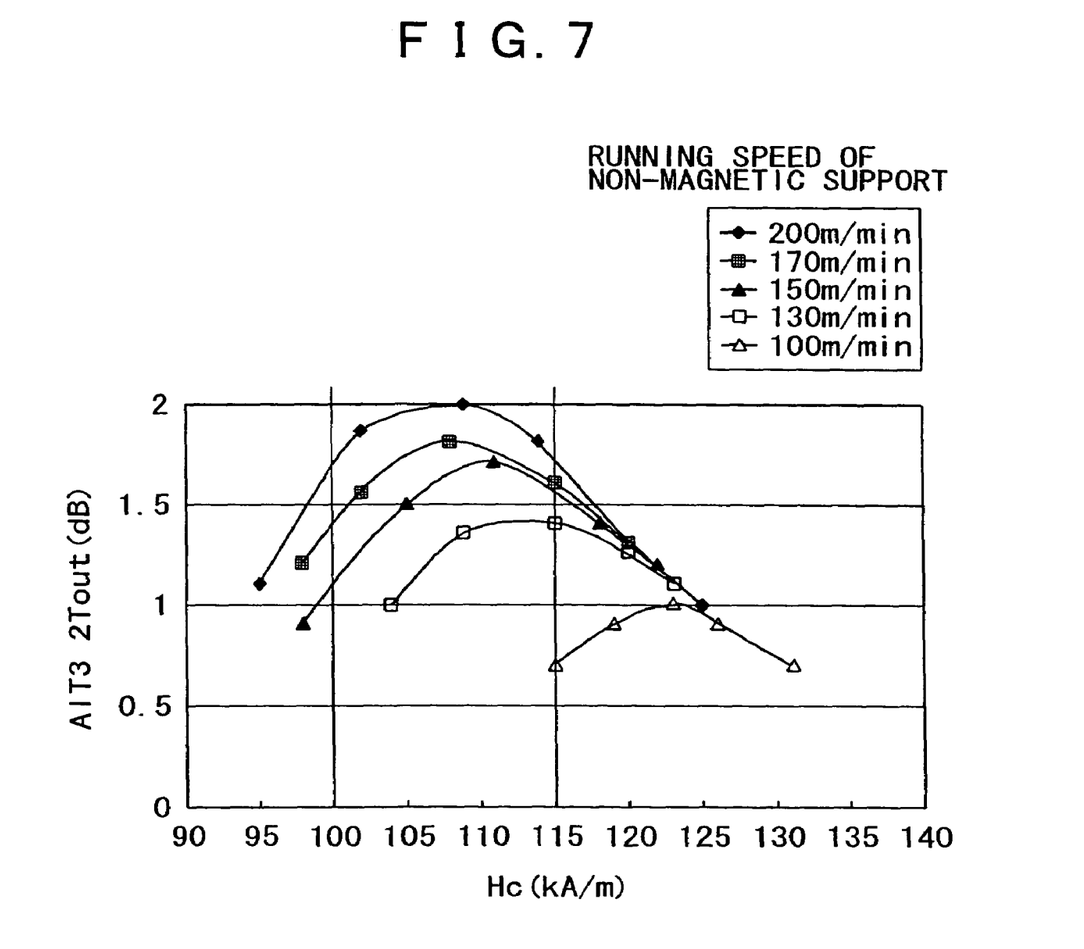
FIG. 7 is a graph showing relations between coercive force Hc of the magnetic recording medium according to preferred examples of the present invention, and output measured at recording frequency 2T (21.55 MHz) under the AIT3 format.
Figure 8:
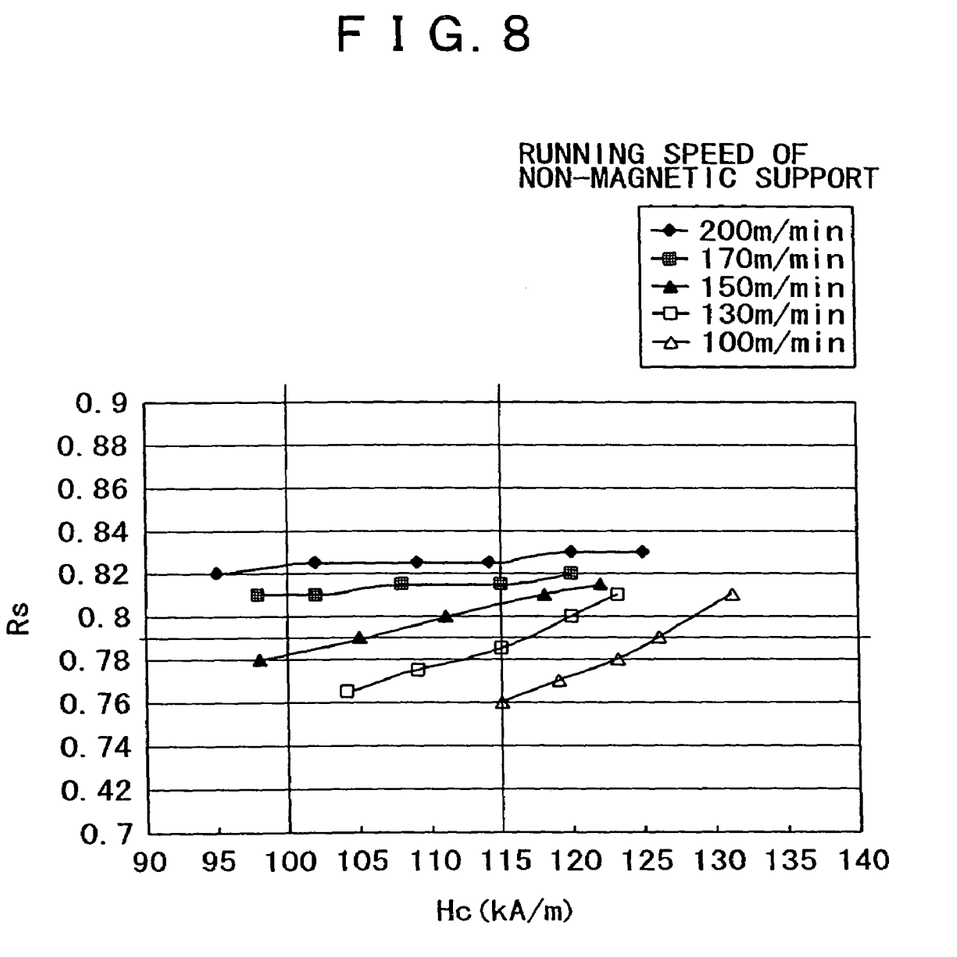
FIG. 8 is a graph showing relations between coercive force Hc and squareness ratio Rs of the magnetic recording medium according to the present invention.

In FIG. 7, the abscissa expresses coercive force Hc measured using the VSM, and the ordinate expresses output at an AIT3 recording frequency of 2T (21.55 MHz). In FIG. 8, the abscissa expresses coercive force Hc measured using the VSM, and the ordinate expresses squareness ratio Rs.

Considering now that the output should be 1.5 dB or larger at a recording frequency of 2T (21.55 MHz) under the AIT3 format, it is found from Table 2 and FIGS. 7 and 8 that the above-described output condition can be satisfied within a range of coercive force Hc from 100 to 115 kA/m, both inclusive, and a range of the squareness ratio Rs of 0.79 or larger, for the running speeds of the non-magnetic support defined as 150 m/min, 170 m/min and 200 m/min. For the running speeds of 100 m/min and 130 m/min, all conditions failed in achieving an output of 1.5 dB required under the AIT3 format.

As has been described in the above, the present invention uses the vacuum evaporation process by which a ferromagnetic metal is deposited on the continuously-run, non-magnetic support under supply of oxygen gas so as to form a magnetic layer composed of a magnetic metal thin film, where employment of the "high-rate evaporation process" based on faster running speed than before successfully reduces the metal crystal size, and suppresses the degree of oxidation of the magnetic layer so as to thin the surface oxide film than in the conventional process and reduce the gap loss.

By setting the running speed of the non-magnetic support as fast as 150 m/min to 200 m/min, both inclusive, and by properly controlling the output conditions of the vacuum evaporation, it is made possible to obtain coercive force Hc and squareness ratio Rs which successfully result in lower noise and higher output. More specifically, a coercive force Hc ranging from 100 kA/m to 115 kA/m, both inclusive, and the squareness ratio of 0.79 or larger result in an output of 1.5 dB or larger, and are successful in providing magnetic recording medium compatible with the AIT3 format (approx. 100 GB/tape), which will be a major standard for the next-generation tape storage.

Using polyamide film as the non-magnetic support can ensure a magnetic tape a high strength and reduced thickness, and thus can provide a large-capacity magnetic recording medium available for long-time recording.

What is claimed is:

1. A method of fabricating a magnetic recording medium, comprising:

forming a magnetic layer including at least a magnetic metal thin film on a non-magnetic support by a vacuum evaporation process in which a magnetic metal material is deposited on said non-magnetic support, which is in continuous running, under supply of oxygen gas so as to have a coercive force Hc of 100 kA/m to 115 kA/m and a squareness ratio of 0.79 or larger, wherein:

said non-magnetic support has a running speed of 150 m/min to 200 m/min, and further wherein a flow rate of injected oxygen during the evaporation process same is at least 2.8 l per minute.

* * * * *